(12) United States Patent
Ferrario et al.

(10) Patent No.: US 6,983,143 B2
(45) Date of Patent: Jan. 3, 2006

(54) METHOD OF MANAGING AND MONITORING PERFORMANCES IN DIGITAL RADIO SYSTEMS

(75) Inventors: Morena Ferrario, Castiglione Olona (IT); Giovanni Mendola, Briosco (IT); Roberto Pellizzoni, Cantù (IT); Roberto Valtolina, Trezzo sull'Adda (IT); Arnaldo Spalvieri, Milan (IT)

(73) Assignee: Alcatel, Paris (FR)

( * ) Notice: Subject to any disclaimer, the term of this patent is extended or adjusted under 35 U.S.C. 154(b) by 670 days.

(21) Appl. No.: 09/987,984

(22) Filed: Nov. 16, 2001

(65) Prior Publication Data

US 2002/0098837 A1    Jul. 25, 2002

(30) Foreign Application Priority Data

Nov. 21, 2000    (IT)    ............................ MI2000A2495

(51) Int. Cl.
  *H04Q 7/20*    (2006.01)
(52) U.S. Cl. ................ 455/424; 455/67.13; 455/115.1; 455/423; 455/115.3
(58) Field of Classification Search ................ 455/423, 455/424, 425, 9, 10, 63, 504, 505, 63.1, 63.2, 455/67.11, 67.13, 67.14, 67.16, 114.2, 115.1, 455/115.2, 115.3, 135, 226.1, 226.2, 277.2, 455/278.1, 296; 375/296, 285, 278; 370/252
See application file for complete search history.

(56) References Cited

U.S. PATENT DOCUMENTS

| | | | |
|---|---|---|---|
| 4,797,903 A | | 1/1989 | Itoh |
| 5,752,190 A | * | 5/1998 | Kaewell et al. ............. 455/436 |
| 6,108,374 A | * | 8/2000 | Balachandran et al. ..... 375/227 |
| 6,442,143 B1 | * | 8/2002 | Corry .......................... 370/252 |
| 6,674,719 B1 | * | 1/2004 | LeCorney ................... 370/235 |
| 6,748,232 B1 | * | 6/2004 | Anderson et al. ........... 455/522 |

FOREIGN PATENT DOCUMENTS

| | | |
|---|---|---|
| EP | 0 709 973 A | 1/1989 |
| WO | WO 94 18756 A | 8/1994 |

OTHER PUBLICATIONS

U. Mengali, et al., "Phase Ambiguity Resolution in Trellis-Coded Modulations", IEEE Transactions on Communications, vol. 38, No. 12, Dec. 1990, pp. 2087-2088.
Chien C et al: "Adaptive Radio For Multimedia Wireless Links" IEEE Journal On Selected Areas in Communication, IEEE Inc., New York, US vol. 17, No. 5, May 1999, pp. 793-813.

* cited by examiner

*Primary Examiner*—Rexford Barnie
(74) *Attorney, Agent, or Firm*—Sughrue Mion, PLLC

(57) ABSTRACT

A method is described for managing and monitoring the performances in digital radio systems. The idea of the invention provides for identifying the type of distorting phenomenon that possibly affects the monitored radio channel; in this way it is also possible to univocally connect, apart from the cause of degrade, the system performances with one of the performance monitoring methods commonly usable. In practice, the invention utilizes two distinct thresholds, each specific to the related corrupting source, and above all it provides an effective technique for discriminating which of the two thresholds is to be compared with the measure of the quality chosen. In a first preferred embodiment of the invention, the type of distortion present in the channel is identified on the basis of the error autocorrelation test at the threshold decision circuit.

12 Claims, 5 Drawing Sheets

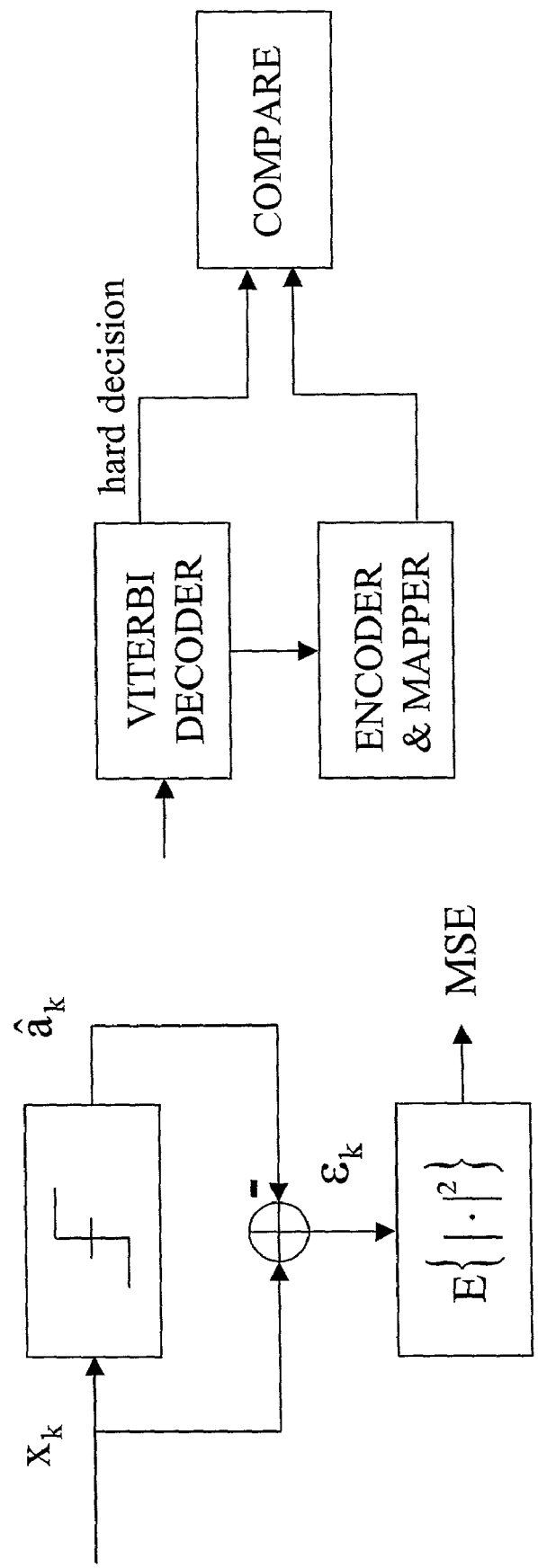

METHOD OF MANAGING AND MONITORING PERFORMANCES IN DIGITAL RADIO SYSTEMS

INCORPORATION BY REFERENCE OF PRIORITY DOCUMENT

This application is based on, and claims the benefit of, Italian Patent Application No. MI2000A002495 filed on Nov. 21, 2000, which is incorporated by reference herein.

BACKGROUND OF THE INVENTION

1. Field of the Invention

The present invention generally relates to the management of a radio transmission system and the monitoring of its performances. In particular, it concerns a method for rendering the signalling of the radio link performances independent of the source degrading the Quality of Service thereof, and for discriminating the type of noise which the radio link is affected by.

2. Description of the Prior Art

The channel corrupting effects, in the domain of a high-capacity radio transmission system, are notoriously distinguished between selective fading and flat fading. The first distorting phenomenon is due to multipaths: the receive antenna can indeed receive, together with desired signal, a delayed replica thereof, caused by the transmitted signal reflection against trophospheric layers or by reflection against orographic obstacles. The desired signal may also become attenuated, with consequent increase of white noise, this latter phenomenon being identified by the cited second corrupting effect.

Under particularly unfavourable conditions, the fading can lead the radio system to outage conditions, rendering the received signal, even processed and/or properly equalized by the receiver system, no longer intelligible.

In order to overcome possible outage situations of the transmission system, the radio systems may be provided with protection mechanisms. For instance, 1+1 configurations are available, wherein the transmission system to be protected (main) is juxtaposed to a spare (stand-by) channel devoted to come into operation if the Quality of Service of the first one is about to become unreliable.

In general, in a N+1 configuration, the spare channel replaces the first of the N protected channels of which the signalling system announces an outage situation.

Thus the importance arises of monitoring the performances of each radio link in a reliable manner in order to evaluate the Quality of Service level and possibly to operatively act through an exchange (if present in the transmission system) in order to improve it. It is however pointed out that the knowledge of the quality level of the radio link (performance monitoring) is a useful information per se, apart from the possible presence of exchange mechanisms.

At present, all the current performance monitoring methods of a radio system monitor the signal and calculate a numeric quantity that is compared with an acceptable limit value or threshold value: if the calculated number is greater that the threshold, it is believe that the transmission is becoming as degraded and, should the above mentioned exchange mechanisms be provided, the transmission is passed to the spare channel.

However, the inefficiency of such methods arises from the fact that the calculated values corresponding for instance to a BER of $10^{-9}$, value that can be considered indicative of a beginning of degrade, are different if we are in the presence of flat fading or selective fading. Unfortunately, at present it is not possible to know if we are really in the presence of the one or the other distorting phenomenon and therefore a compromise is carried out, namely it is decided to forewarn the system at a certain value. The drawback of this procedure is that one is forced either to tolerate a channel degraded by an excessive selective fading or, conversely, to forewarn the system in the presence of a still-acceptable flat fading.

SUMMARY OF THE INVENTION

The main object of the present invention is to provide mechanisms which implement the performance monitoring function in a reliable manner, mainly in the sense that they are independent of the degrade source, should it be either flat fading or selective fading. Indeed, as mentioned above, the effects of a selective distortion (selective fading) or of an in-band uniform attenuation (flat fading), cause different effects on the apparatus and circuits present in the demodulator at the receiver side. In particular, the FECs (Feed-Forward Error Corrections), often present inside the transmission system, exhibit performances that depend on the statistical distribution of the signal at their input and then, lastly, on the type of distortion suffered by the transmitted signal, whether selective or uniform in band.

This and other objects are achieved by a method having the characteristics set forth in the independent claim 1. Further advantageous characteristics are set forth in the dependent claims. All the claims should be considered as an integral part of the present description.

The basic idea of the present invention comprises a first step of identifying the type of distorting phenomenon that possibly affects the monitored radio channel; in this way, it is also possible to univocally connect, apart from the cause of degrade, the system performances with one of the commonly-usable performance monitoring methods.

In practice, the invention provides for the use of two distinct thresholds, each threshold being specific to the related corrupting source and, above all, it provides for an effective technique for discriminating which of the two thresholds has to be compared with the chosen measure of quality.

In a first preferred embodiment of the invention, the type of distortion present in the channel is identified according to the error autocorrelation evaluation at the threshold decision circuit.

The invention will become certainly clear in view of the following detailed description, given by way of mere example and not of limitation and to be read with reference to the attached figures wherein:

BRIEF DESCRIPTION OF THE DRAWINGS

FIG. 2 is a basic diagram of a circuit for the Mean Square Error (MSE) computation underlying the measurement method M1;

FIG. 3 is a basic diagram of the circuit for estimating the number of errorred symbols per second underlying the measurement method M3;

BEST MODE FOR CARRYING OUT THE INVENTION

Figure 1:
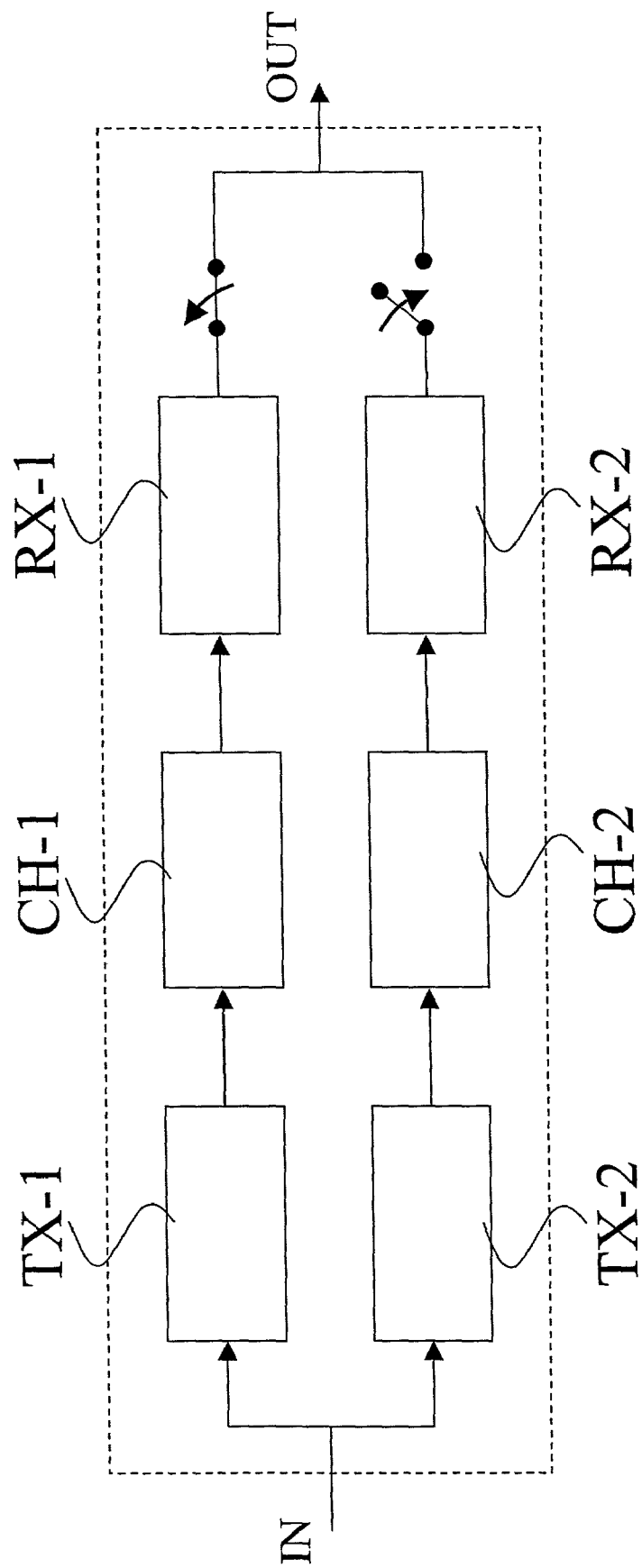
FIG. 1 shows a basic diagram of a radio transmission system in a 1+1 configuration.

The known methods that are used for measuring the Quality of Service offered by a radio link can be classified into three main groups, M1, M2 and M3 described below in greater detail.

M1) The computation of the Mean Square Error (MSE), defined as:

$$MSE = E\{|x_k - \hat{a}_k|^2\} = E\{|\epsilon_k|^2\} \quad (1)$$

$x_k$ being the signal at the input of the threshold decision circuit (and then, after suitable equalization, gain control and phase correction operations) and $\hat{a}_k$ being the symbol decided by the threshold decision circuit, and $E\{\cdot\}$ denoting the expected value operation (see FIG. 2 for this purpose). Operatively, the MSE is then calculated through a sample mean operation:

$$MSE = \frac{1}{M}\sum_{k=1}^{M}|\epsilon_k|^2 = \frac{1}{M}\sum_{k=1}^{M}\{[Re(\epsilon_k)]^2 + [Im(\epsilon_k)]^2\} \quad (2)$$

with M being a positive integer and Re, Im being the real and imaginary parts, respectively. Often equation (2) is replaced by a merit figure that is simpler to be computed, but less accurate, denoted by SMSE, consisting in:

$$SMSE = \frac{1}{M}\sum_{k=1}^{M}\{|Re(\epsilon_k)| + |Im(\epsilon_k)|\}$$

The increase in the value of MSE, or SMSE, indicates a rise in the mean deviation between the received signals and the possible symbols of the transmitted constellation, with a consequent increase in the uncertainty on the decisions taken and worsening of the Quality of Service.

M2) The second method of evaluating the Quality of Service makes reference to a parameter inherent to the code trellis in Trellis Coded Modulations (TCM). The parameter $Z_k$ (see the publication "Phase Ambiguity Resolution in Trellis Coded Modulations", IEEE Transaction on Communications, Vol. 38, No. 12, pages 2087–2088, December 1990) represents the minimum branch metrics emerging from the minimum metrics state or, considering $y_k$ the input of the Viterbi decoder and $\hat{a}_k$ the symbol associated with the generic branch emerging from the terminal node of the minimum-distance path at the instant t=k, it is defined:

$$z_k = \min_{\tilde{a}_k}\{|y_k - \tilde{a}_k|\}$$

The choice of monitoring the sequence $\{Z_k\}$ comes from the remark that the statistics of this parameter differs considerably as the goodness of the system performances varies.

M3) The last method consists in carrying out an estimation of the number of errored symbols per second. The flow outputting from the Viterbi decoder is encoded again (see FIG. 3) and then compared with the decisions carried out directly on the received signal and not passed through the decoder. If the two streams are different, this means that the radio channel has introduced errors that reduce the offered Quality of Service.

Typically, the comparison between a suitable threshold and a value calculated through M1, M2, or M3 constitute the control logic of the alarms warning about the worsening of the system performances.

The alarm issue on the basis of the chosen threshold has the object of signalling the performance degrade in time, i.e. before the transmission becomes completely unreliable and in such a way as to operate in good time the above mentioned possible exchange mechanisms. By quantifying more precisely, by way of example and not of limitation, it would be desired that the signalling, called early warning alarm according to what has been clarified above, should actually be at a Bit Error Rate value of about $10^{-9}$.

However, measurements have been carried out and they indicate that the value of each of the parameters described above, used as a measure of the Quality of Service offered by the system, is indeed related to the quality actually present, but it changes numerically also as the source of degrade, be flat or selective fading, varies. From this, it is immediately perceived that the comparison of such quantities with a threshold cannot be sufficient to provide indications on the system performance in an univocal manner. In fact, at a given BER, the value taken on by one of the above-mentioned estimators changes as the cause of degrade varies or, conversely, when the numeric value taken by one of the estimators is equal, the value of BER can be significantly different. It is therefore easy to understand that the early warning alarm can be actuated at different values of BER, dependent on the source that is degrading the transmission.

In view of the described drawbacks, the present invention provides a method that univocally links, apart from the cause of degrade, the system performances to one of the measures of the above mentioned and commonly usable parameters.

As mentioned above, the invention provides for the use of two distinct thresholds, each specific to the related corrupting source, and above all it provides an effective technique for discriminating which of the two thresholds is to be compared with the quality measure which has been chosen.

In FIG. 1 there is schematically a basic diagram of a radio transmission system in a "1+1" configuration. In FIG. 1, blocks TX and RX represent the transmitter and receiver devices respectively, while CH represents the transmission channel (channels 1 is the main channel and channel 2 is the spare one).

The method for discriminating the type and the cause of degrade of a radio channel will now be first illustrated in detail.

Figure 4:
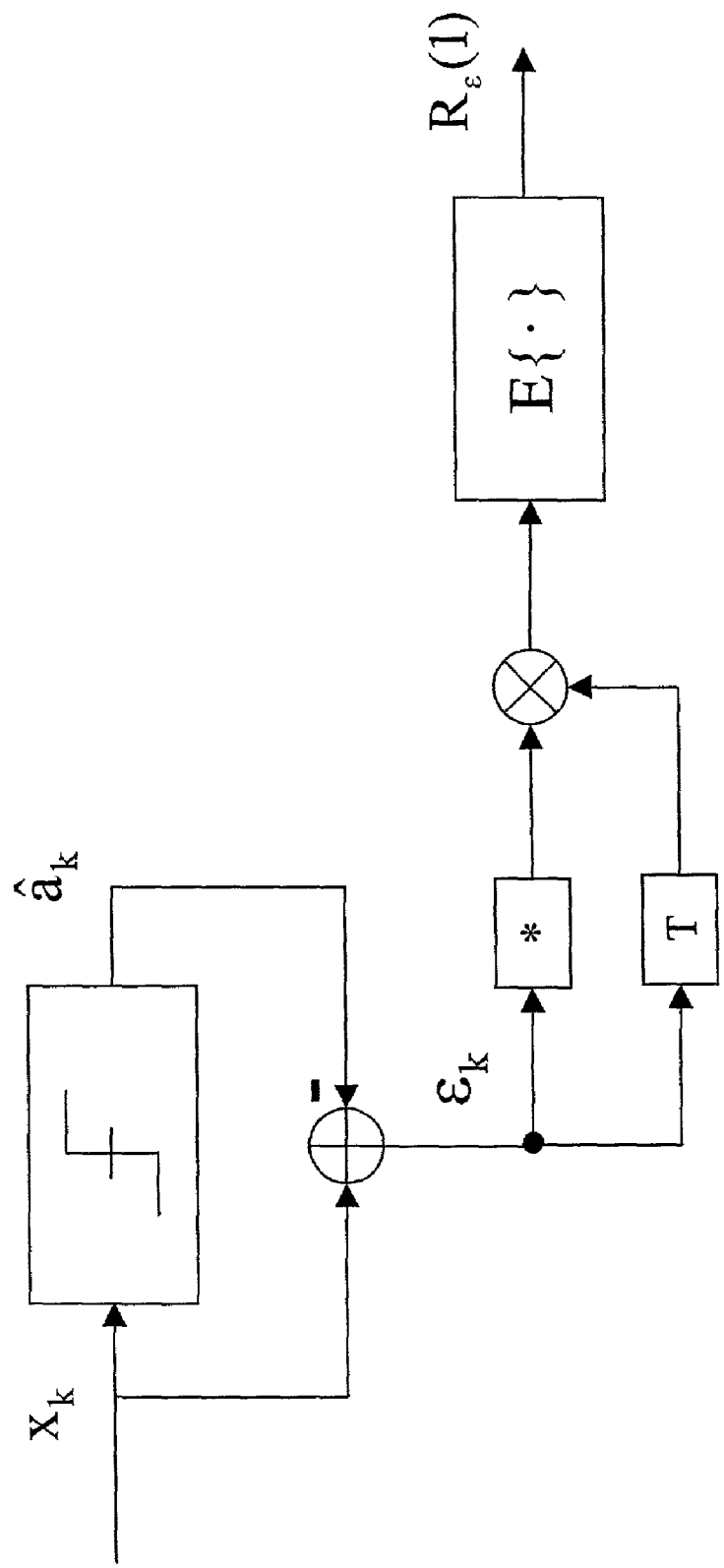
FIG. 4 schematically shows the circuit for calculating the autocorrelation of the error, in particular of a significant sample thereof, in accordance with the present invention.

FIG. 4 schematically shows the circuit for the computation of the error autocorrelation, in particular of a significant sample thereof, in accordance with the present invention. Let $R_\epsilon(n)$ be the error autocorrelation, defined by stationary processes in the following way:

$$R_\epsilon(n) = E\{\epsilon(k)\cdot\epsilon^*(k+n)\} \quad (3)$$

where $$\epsilon(k) = x_k - \hat{a}_k \quad (4)$$

is the error calculated after a threshold decision circuit (DEC). One can verify that the shape of the autocorrelation $R_\epsilon(n)$ strongly depends on the statistics of the input signal, even in the presence of an equalization device. For instance in the case where flat fading is present and the equalization devices completely remove the Intersymbol Interference effects leaving as unique effect the thermal noise one (i.e. flat fading), we have:

$$x_k = a_k + n_k \quad (5)$$

$a_k$ being the transmitted symbol and $n_k$ the additive, Gaussian and white thermal noise.

Assuming that the decisions taken are correct, if we replace equation (5) into (4), the expression of the error $\epsilon(k)$ becomes:

$$\epsilon(k) = a_k + n_k - a_k = n_k \quad (6)$$

and then eq (3) lastly becomes:

$$R_\epsilon(n) = E\{\epsilon(k) \cdot \epsilon^*(k+n)\} = E\{n(k) \cdot n^*(k+n)\} = \sigma_n^2 \delta(n) \quad (7)$$

where $\sigma_n^2$ represents the noise power at the input of the decision circuit and $\delta(n)$ is the Dirac function.

Then this means that, in the presence of thermal noise only, i.e. of in-band uniform attenuation, the error autocorrelation $R_\epsilon(n)$ is impulsive, i.e.

$$R_\epsilon(n) = \begin{cases} \sigma_n^2 & \text{if } n = 0 \\ 0 & \text{if } n \neq 0 \end{cases} \quad (8)$$

Consider now, instead, the situation where, in the presence of a strong distortion, the devices of equalization are not able to completely cancel the Intersymbol Interference. In this case the signal at the input of the decision circuit (equation (5)) becomes:

$$x_k = a_k + \sum_{j \neq k} a_j g_{k-j} + w_k$$

$g_n$ being the pulse response samples of the whole transmission system, comprising the transmitter and receiver filterings, the equalizer and obviously the radio channel, and $w_k$ the resulting sample of the convolution between the white noise at the input of the receiver and the pulse response of the receiver filters. To be noted that, under the cited conditions, the autocorrelation of the pulse response of the equalization devices may be not of impulsive type and thus the noise at the output thereof will be coloured.

It can be demonstrated that in this case, still assuming that the decision circuit carries out correct decisions, the error autocorrelation (3) becomes:

$$R_\epsilon(n) = E\{\epsilon(k) \cdot \epsilon^*(k+n)\} = \sigma_a^2 (R_g(n) - \delta(n)) + R_w(n)$$

where $\sigma_a^2 = E\{|a_k|^2\}$ and $R_g$ and $R_w$ being respectively the autocorrelation of $g_n$ and $w_n$. As $R_g$ and $R_w$ result in being non impulsive, one deduces that, in the presence of distortion, the error autocorrelation cannot be impulsive itself.

The cause of degrade of the Quality of Service of the radio link can therefore be determined by the analysis of the values of the error autocorrelation $R_\epsilon(n)$ for $n \neq 0$: from what it has been said, values considerably different from zero will indicate that the degrade of the performances shall be ascribed to selective fading, conversely zero values will identify the flat fading as current cause of degrade of the Quality of Service.

In the discrimination of the two situations, it is moreover sufficient to use error autocorrelation samples close to the origin, for instance $R_\epsilon(1)$.

Then the fact that, in practice, it is hard that the two situations are so clearly distinguishable, i.e. that precisely zero values of the first error autocorrelation sample are found, renders advisable to fix a threshold, say $T_{R_\epsilon(1)}$, which $R_\epsilon(1)$ is to be compared with: if $R_\epsilon(1) \geq T_{R_\epsilon(1)}$ one will conclude to be in the presence of selective fading, otherwise of flat fading.

The correct discrimination, instant by instant, of the current source of degrade may consequently allow the validation of one of the two appropriate thresholds, each related to the respective corrupting cause, to be compared with one of the possible measures of quality chosen, should it be M1, M2 or M3.

Figure 5:
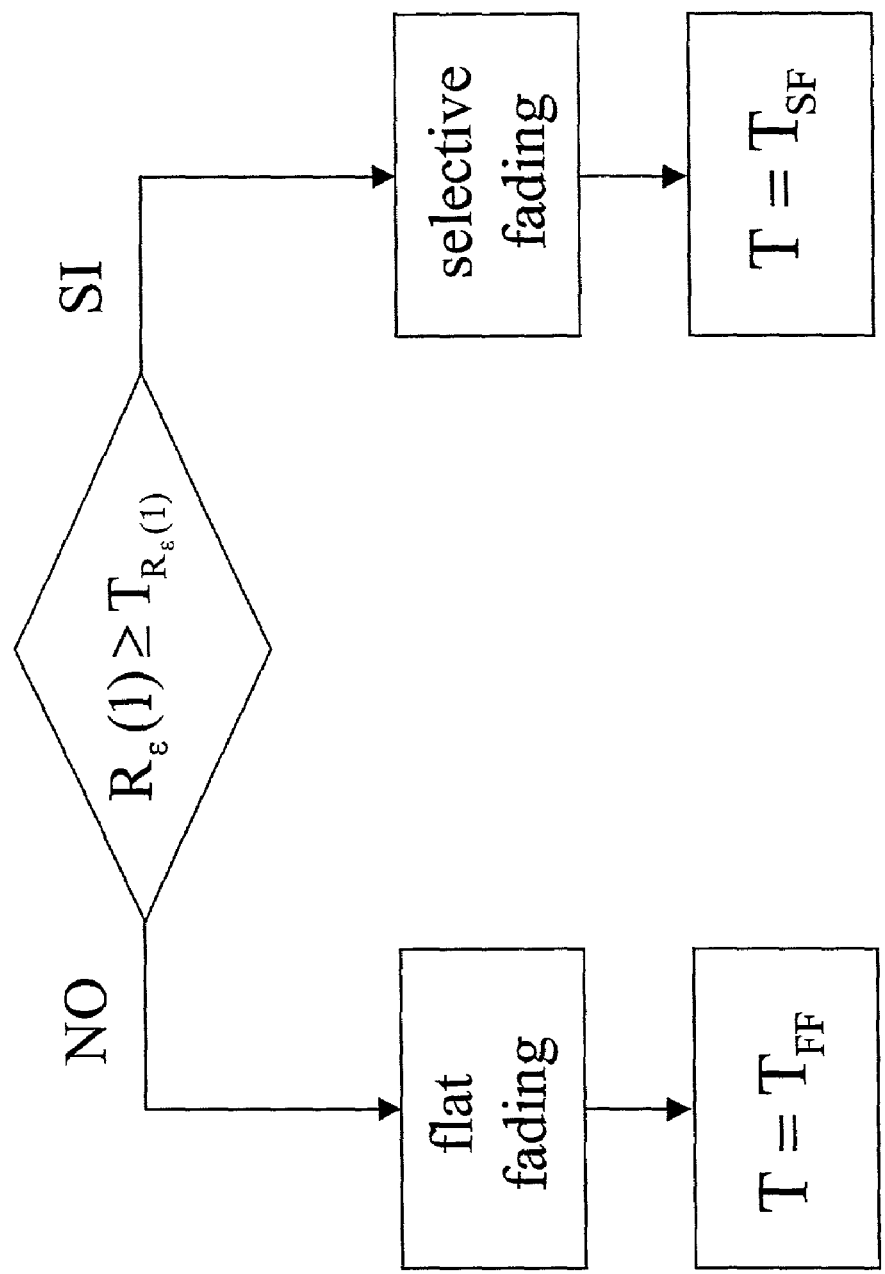
FIG. 5 shows the block diagram of the algorithm according to the present invention for implementing the performance monitoring.
Figure 6:
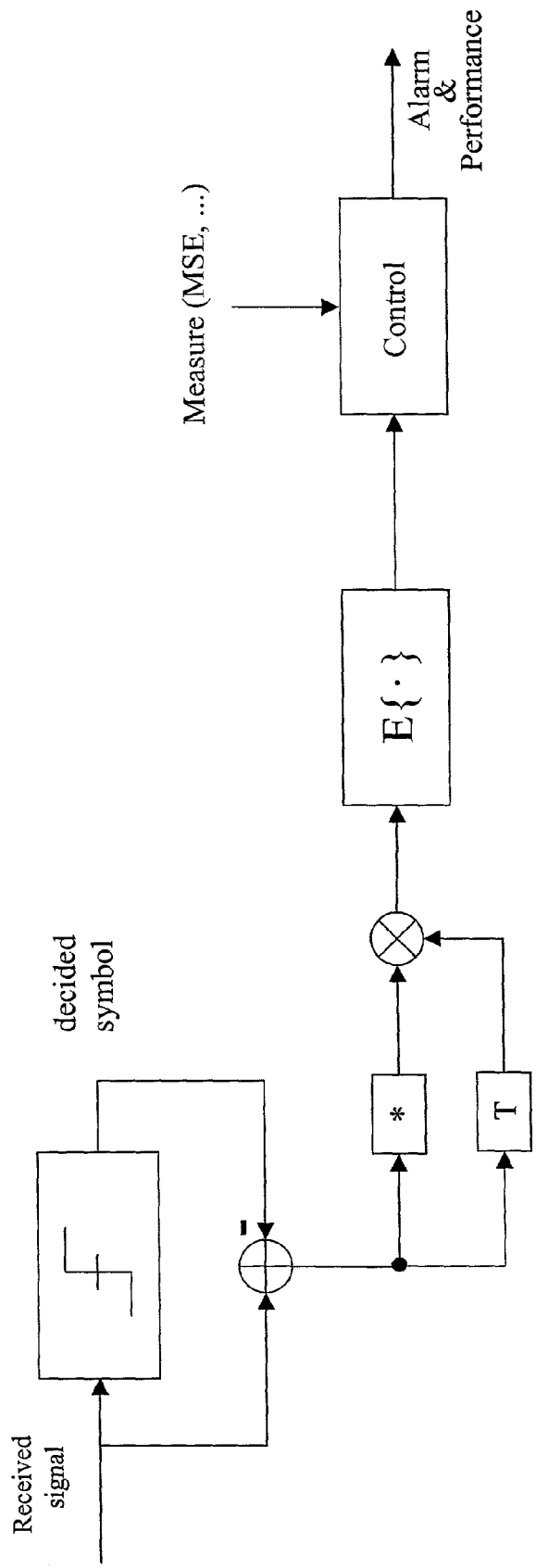
FIG. 6 shows, in a schematic and concise manner, the algorithm according to the present invention.

The discrimination algorithm of the degrade source and the consequent choice of the appropriate threshold can therefore be synthesized in the following way (see FIG. 5):

$$T = \begin{cases} T_{FF} \Leftrightarrow R_\epsilon(1) < T_{R_\epsilon(1)} \\ T_{SF} \Leftrightarrow R_\epsilon(1) \geq T_{R_\epsilon(1)} \end{cases}$$

where T is the current threshold for the comparison with the measure of quality which one wish to use, $T_{FF}$ is the value of the threshold that is deemed as appropriate in case of flat fading and analogously $T_{SF}$ is the related threshold in the presence of selective fading.

Although the present invention provides for evaluating the distortion type of a channel according to the error autocorrelation values, it is naturally possible to use other methods. For instance one could observe the Fourier transform of the equalizer coefficients or in general one could observe one or more parameters of the equalizer (whether linear or non linear) and apply a suitable algorithm.

There has thus been shown and described a novel method which fulfills all the objects and advantages sought therefor. Many changes, modifications, variations and other uses and applications of the subject invention will, however, become apparent to those skilled in the art after considering the specification and the accompanying drawings which disclose preferred embodiments thereof. All such changes, modifications, variations and other uses and applications which do not depart from the spirit and scope of the invention are deemed to be covered by the invention which is limited only by the claims which follow.

What is claimed is:

1. A method of managing a radio transmission system affected by a source of degrade, the radio system comprising:
   at least one transmitter receiving a signal to be transmitted at an input of said at least one transmitter;
   at least one transmission channel; and
   at least one receiver for receiving signals transmitted by said at least one transmitter, the method comprising:
   measuring quality of service offered by the radio system;
   obtaining a value indicative of a quality of signal;
   evaluating a type of the degrade source;
   associating a certain threshold value with each type of the degrade source; and
   comparing the value indicative of the quality of signal with the certain threshold value corresponding to the source of degrade present in the transmission channel.

2. The method according to claim 1, wherein said evaluating the type of the source of degrade comprises evaluating samples of error autocorrelation.

3. The method according to claim 1, wherein said evaluating the type of the source of degrade comprises comparing a first error autocorrelation sample with a threshold value, and when the first error autocorrelation sample is greater than the threshold value, deducting that the transmission channel is affected by selective fading, otherwise said transmission channel is affected by flat fading.

4. The method according to claim 1, wherein said measuring the quality of service offered by the radio system and said obtaining the value indicative of the quality of the signal comprise performing a computation of mean square error.

5. The method according to claim 1, wherein said measuring the quality of service offered by the radio system and obtaining the value indicative of the quantity of signal comprise calculating a parameter inherent to trellis of codes in Trellis-coded modulations.

6. The method according to claim 1, wherein said measuring the quality of service offered by the radio system and obtaining the value indicative of the quality of signal comprise carrying out an estimation of a number of errorred symbols per second.

7. The method according to claim 1 wherein the radio system further comprises at least one main channel to be protected and one spare channel, and wherein the method further comprises utilizing the spare transmission channel when the value indicative of the quality of signal in the main channel is greater than the corresponding threshold value.

8. The method according to claim 1, further comprising emitting alarms when the value indicative of the quality of signal is greater than the corresponding threshold value.

9. A method of managing a radio transmission system affected by a source of degrade, the radio communication system comprising:

at least one transmitter receiving at an input a signal to be transmitted;

at least one transmission channel; and at least one receiver for receiving signals transmitted by said at least one transmitter, the method comprising:

measuring a quality of service offered by the radio system;

obtaining a value indicative of a quality of a signal based on said measuring;

determining a type of the degrade source present in the transmission channel;

selecting a threshold value corresponding to the determined type of the degrade source from at least two threshold values, where each of said at least two of threshold values corresponds to a type of the degrade source; and comparing the value indicative of the quality of the signal with the selected threshold value.

10. The method according to claim 9, wherein said at least two threshold values are predetermined and wherein a first threshold value corresponds to selective fading and a second threshold value corresponds to flat fading.

11. The method according to claim 10, wherein said determining the type of the degrade source comprises comparing a first error autocorrelation sample with a threshold value, and based on said comparison determining the type of the degrade source, wherein when the first error autocorrelation sample is greater than the threshold value, the channel is affected by the selective fading, and when the first error autocorrelation sample is not greater than the threshold value, the channel is affected by the flat fading.

12. The method according to claim 11, wherein the threshold value is selected based on the determined type of the degrade source and wherein each of the at least two threshold values is predetermined and is unique to a corresponding type of the degrade source.

* * * * *